(Model.)
A. O. PETERSON.
Milk Can.
No. 243,612.    Patented June 28, 1881.
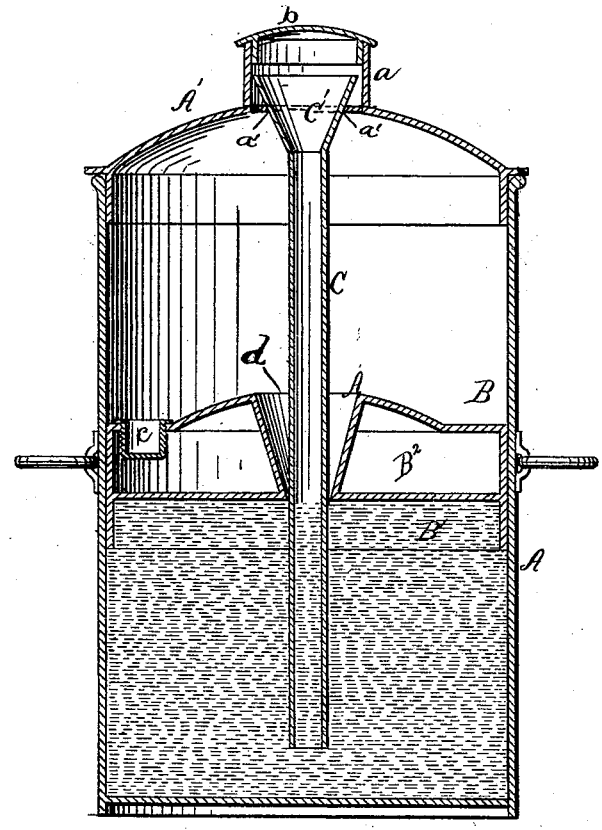
WITNESSES
J. W. Garner
W. S. D. Haines
INVENTOR
A. O. Peterson
By H. J. Ennis,
ATTORNEY

UNITED STATES PATENT OFFICE.

AUGUSTUS O. PETERSON, OF EMMETTSBURG, IOWA.

MILK-CAN.

SPECIFICATION forming part of Letters Patent No. 243,612, dated June 28, 1881.

Application filed April 22, 1881. (Model.)

*To all whom it may concern:*

Be it known that I, A. O. PETERSON, a citizen of the United States, residing at Emmettsburg, in the county of Palo Alto and State of Iowa, have invented certain new and useful Improvements in Cream and Milk Carrying Cans; and I do hereby declare the following to be a full, clear, and exact description of the invention, such as will enable others skilled in the art to which it appertains to make and use the same, reference being had to the accompanying drawing, and to letters or figures of reference marked thereon, which form a part of this specification, and in which the figure is a vertical section of my improved milk-can.

This invention appertains to an improvement in milk-cans, adapted particularly for rural districts in collecting quantities of milk from different dairymen, its object being to prevent excessive agitation of the cream, and to permit of the ready filling of the can; and it consists of a float with a chamber upon its under side, and having a tube passing through it, adapted to allow of the filling of the can, substantially as and for the purpose set forth.

Referring to the accompanying drawing, A is a milk-can of ordinary construction, with handles at opposite sides. Fitted upon the upper end of the cylindrical portion of the can is a cap, A', readily removable to permit of the emptying of the can. Around a central opening, $a'$, in the cap A' is a flange, $a$.

$b$ is the cap or cover fitted upon the neck or flange $a$, the removal of which permits of the filling of the can.

B is the float, which has an open chamber, B', upon its under side, the lower edge of which rests upon the can-bottom before filling the can. This float has a closed chamber, $B^2$, having a central funnel-shaped opening, $d$, passing through it. The chamber is provided with a screw-cap, $c$, which is unscrewed to allow the heated air to escape when steam or hot water is used in cleansing.

C is a tube reaching down through the opening $d$ of the float, and with its upper end provided with a funnel, C', filling the chamber in the neck $a$ of the cap A', and prevented from passing through the opening $a'$ by the larger portion of funnel C'.

It will be noticed that as the milk or cream is poured into the funnel C' of the tube C it passes down under the float B, which will rise and continue to do so as the filling process proceeds, and thus hold it as against splashing or violent agitation, which is especially needful where the can is only partially full. The great value or utility of this float is seen where a great amount of country is traveled over in collecting the milk or cream from different dairymen, to prevent the continued and violent agitation that would otherwise take place from converting the contents of the can. The passage $d$, being larger at the top, admits of the easy insertion of the tube C when the cover is on. The float B also serves to steady the tube C and prevent it oscillating or churning the contents during transportation.

Having thus described my invention, I claim and desire to secure by Letters Patent—

1. In a carrying-can for milk and cream, the can A, provided with the cover A', having the chamber $a\ a'\ b$, in combination with the funnel-tube C C', suspended in said chamber, substantially as set forth.

2. In a carrying-can, the can A, cover A', having suspended therein the funnel-tube C C', in combination with the float B, having the conical passage $d$, closed chamber $B^2$, and open chamber B', substantially as set forth.

In testimony whereof I hereby subscribe my name in the presence of two witnesses.

A. O. PETERSON.

Witnesses:
 W. H. ROBBINS,
 W. J. BROWN.